DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED DECEMBER 2, 1975

941 O.G. 8

T941,015

WOVEN FABRIC HAVING UNIFORM AIR PERMEABILITY AND FORMING PROCESS

Clifford Hoyle and Lewis Charles Huskilson, Kingston, Ontario, Canada, assignors to Du Pont of Canada Limited, Montreal, Quebec, Canada

Continuation of abandoned application Ser. No. 347,550, Apr. 4, 1973. This application Sept. 30, 1974, Ser. No. 511,027

Int. Cl. D03d *15/00*

U.S. Cl. 139—420

No Drawing. 9 Pages Specification

An uncoated woven fabric of heat-shrinkable synthetic thermoplastic yarn having a very low air permeability is disclosed. The process for making the fabric comprises weaving as tightly as practical, on a commercial basis the synthetic thermoplastic yarn (preferably a multifilament interlaced nylon yarn having substantially zero bundle twist) into a fabric; and heating the fabric under substantially no tension (preferably on a tenter frame) to a temperature approaching the melting point of the yarn.